US012706943B2

(12) United States Patent
Hlavac et al.

(10) Patent No.: US 12,706,943 B2
(45) Date of Patent: Aug. 11, 2026

(54) AUTOMATED THREAT RESPONSE IN EXTENDED DETECTION AND RESPONSE (XDR) SYSTEMS

(71) Applicant: Cisco Technology, Inc., San Jose, CA (US)

(72) Inventors: Jaroslav Hlavac, Prague (CZ); Martin Kopp, Komarov (CZ); Michael Adam Polak, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 18/368,392

(22) Filed: Sep. 14, 2023

(65) Prior Publication Data

US 2024/0356962 A1 Oct. 24, 2024

Related U.S. Application Data

(60) Provisional application No. 63/461,406, filed on Apr. 24, 2023.

(51) Int. Cl.
*H04L 9/00* (2022.01)
*H04L 9/40* (2022.01)

(52) U.S. Cl.
CPC ...... *H04L 63/1441* (2013.01); *H04L 63/1416* (2013.01)

(58) Field of Classification Search
CPC ............. H04L 63/1441; H04L 63/1416; H04L 63/1433
See application file for complete search history.

(56) References Cited

U.S. PATENT DOCUMENTS

| | | | | |
|---|---|---|---|---|
| 10,178,109 | B1 * | 1/2019 | Miskovic | H04L 63/1416 |
| 10,873,596 | B1 * | 12/2020 | Bourget | H04L 51/02 |
| 2014/0201836 | A1 | 7/2014 | Amsler | |
| 2019/0260769 | A1 | 8/2019 | Doron et al. | |
| 2020/0004957 | A1 * | 1/2020 | Chamaraju | G06N 20/00 |

(Continued)

OTHER PUBLICATIONS

Search Report and Written Opinion for International Application No. PCT/US2024/023680, Dated Jul. 29, 2024, 13 pages.

(Continued)

*Primary Examiner* — Syed M Ahsan
(74) *Attorney, Agent, or Firm* — Lee & Hayes, P.C.

(57) ABSTRACT

Techniques and architecture are described for automated threat response and remediation of incidents generated by single or multiple security products. The techniques and architecture provide a framework for automated threat response and remediation of incidents generated by single or multiple security products, especially for extended detection and response (XDR) systems. In particular, the techniques and architecture provide for an automated threat response that is handled by an auto-analyst engine emulating security analysts' steps during incident response and remediation. The automated threat response automatically confirms or disapproves of detection verdicts thereby reducing false positives that analysts usually have to deal with. If any actions are needed from a security analyst, a concise report of actions taken, gathered information and recommended next steps are provided by the automated threat response, significantly reducing the time and resources needed to resolve an incident.

20 Claims, 6 Drawing Sheets

(56) References Cited

U.S. PATENT DOCUMENTS

| | | | | |
|---|---|---|---|---|
| 2021/0297427 | A1* | 9/2021 | Narula | G06F 3/048 |
| 2022/0086173 | A1* | 3/2022 | Yavo | H04L 63/1416 |
| 2022/0166801 | A1 | 5/2022 | Murphy et al. | |
| 2022/0269780 | A1* | 8/2022 | Hencinski | G06F 21/554 |
| 2023/0146804 | A1 | 5/2023 | Narula et al. | |

OTHER PUBLICATIONS

George, D. A. S., George, A. H., Baskar, T., & Pandey, D. (2021). XDR: The Evolution of Endpoint Security Solutions—Superior Extensibility and Analytics to Satisfy the Organizational Needs of the Future. International Journal of Advanced Research in Science, Communication and Technology (IJARSCT), 8(1), 493-501.

* cited by examiner

AUTOMATED THREAT RESPONSE IN EXTENDED DETECTION AND RESPONSE (XDR) SYSTEMS

CROSS-REFERENCE TO RELATED APPLICATION

This patent application claims priority to U.S. Provisional Patent Application No. 63/461,406, filed Apr. 24, 2023, which is fully incorporated herein by reference.

TECHNICAL FIELD

The present disclosure relates generally to automated threat response in extended detection and response (XDR) systems, and more particularly, to a framework for automated threat response and remediation of incidents generated by single or multiple security products.

BACKGROUND

One of the responsibilities of a network security entity, e.g., a security operations center (SOC) team, is to resolve network security alerts that come out of many security products running in their environments. There can be thousands of security alerts to handle, which leads to a lot of manual work. This often leads to multiple members of the network security entity repeating the same steps over and over. The first step a network security entity analyst takes when responding to a security alert is to run a playbook, which is a set of predefined actions. The network security entity analyst runs the playbook manually for each security alert, looking at the results and determining how to resolve the security alert. This is time-consuming and can be inefficient. This can also lead to mistakes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
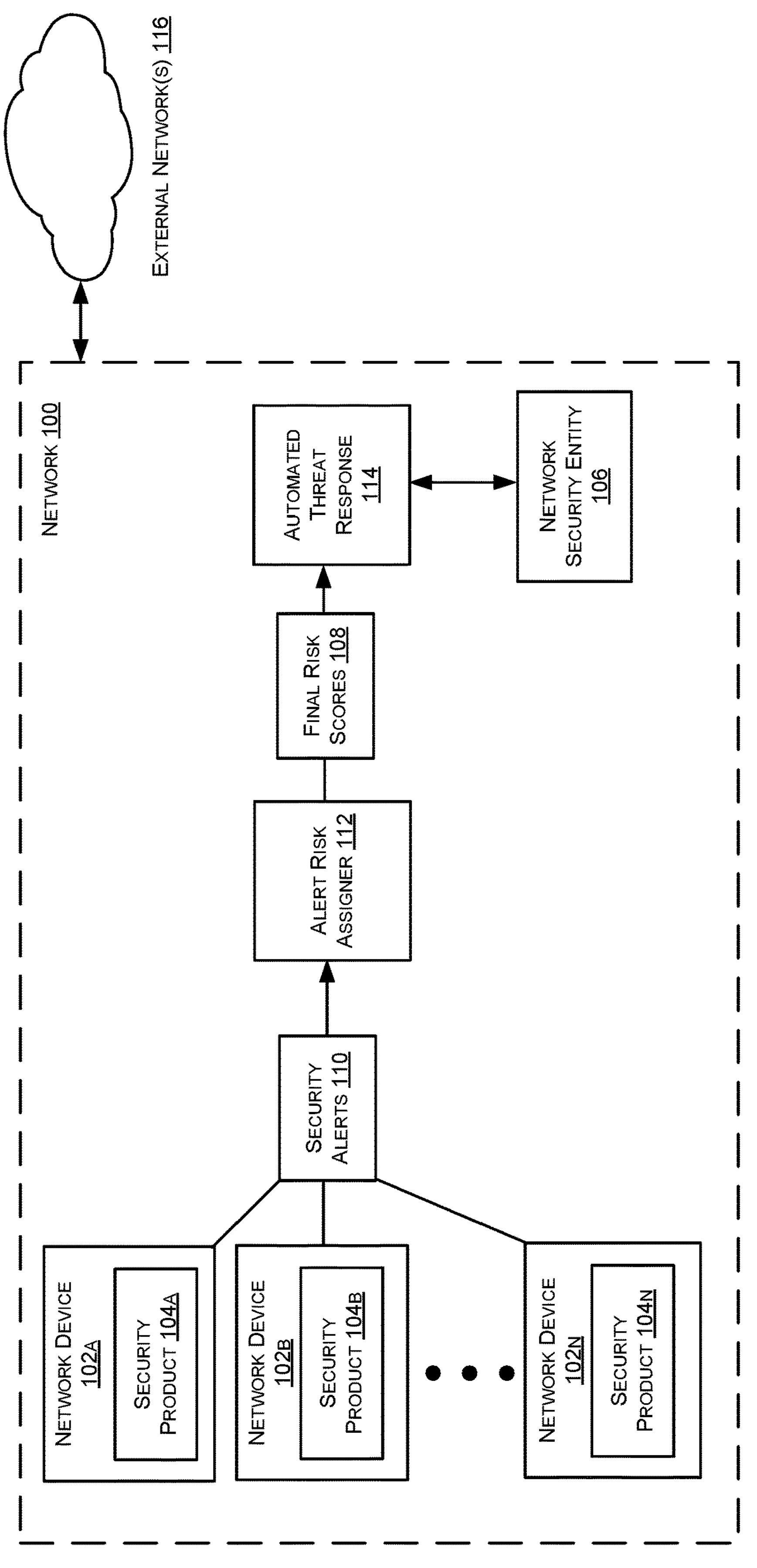
FIG. 1 schematically illustrates an example network that includes network devices and an automated threat response, in accordance with techniques and architecture described herein.

The present disclosure provides techniques and architecture for a framework for automated threat response and remediation of incidents generated by single or multiple security products, especially for extended detection and response (XDR) systems. In particular, the techniques and architecture provide for an automated threat response that is handled by emulating network security entity analysts' steps during incident response and remediation. The automated threat response can automatically confirm or disapprove of detection verdicts thereby reducing false positives that analysts usually have to deal with. If any actions are needed from a network security entity analyst, a concise report of actions taken, gathered information and recommended next steps may be provided by the automated threat response, significantly reducing the time and resources needed to resolve an incident.

As an example, a method may include receiving, at an automated threat response within a network, an incident relating to network security at a network device. The method may also include automatically determining, by an auto-analyst engine of the automated threat response, whether the incident is a security problem. The method may further include based at least in part on the automatically determining whether the incident is a security problem, taking, by the auto-analyst engine, at least one further first step relating to the incident. In configurations, if the incident is not a security problem, the at least one further first step may comprise generating, by the auto-analyst engine, a summary relating to the incident, wherein the summary comprises an indication of the incident as a false positive and adding the summary to an incident database. In configurations, if the incident is a security problem, the at least one further first step may comprise adding, by the auto-analyst engine, information regarding the incident to the incident database.

Example Embodiments

In accordance with configurations described herein, as previously noted, techniques and architecture are provided for a framework for automated threat response and remediation of incidents generated by single or multiple security products, especially for extended detection and response (XDR) systems. In particular, the techniques and architecture provide for an automated threat response that is handled by emulating network security entity analysts' steps during incident response and remediation. The automated threat response can automatically confirm or disapprove of detection verdicts thereby reducing false positives that analysts usually have to deal with. If any actions are needed from a network security entity analyst, a concise report of actions taken, gathered information and recommended next steps are provided by the automated threat response, significantly reducing the time and resources needed to resolve an incident.

More particularly, an automated threat response provides a system that automates the process of execution of common steps of a network security alert remediation process, which speeds up the response time, as well as saves time, for network security entity analysts. The automated threat response ingests network alert events from multiple telemetry sources (security products, security product vendors, operating system logs, etc.). Based on steps defined in an auto-analyst engine of the automated threat response, actions are taken automatically with the integrated auto-analyst engine and third-party application programming interfaces (APIs).

As an example, in configurations there may be two types of queries the auto-analyst uses for threat response. A first type of query may be "GetInformation." Based on the incident that is on the input to the automated threat response, an auto-analyst may query a specific API for more information, e.g., a malicious binary execution leads to a GetInformation query to see whether it is still running on the endpoint. A second type of query may be "TakeAction." If an auto-analyst of the automated threat response knows an action can be safely taken to remediate some threat, the auto-analyst can automatically take the action, e.g., a suspicious binary may be deemed as malicious and is still running on the endpoint. In such a scenario, the auto-analyst may send a TakeAction query to the endpoint API to kill the running process, or the auto-analyst can isolate the network device from the rest of the network to monitor the malicious process without posing a security threat to the rest of the network.

These two steps are generally used across the network security entity playbooks, e.g., security operations center (SOC) playbooks, which enables the auto-analyst to work with already manually written workbooks, e.g., SOC playbooks. Moreover, in configurations, the auto-analyst can also automatically learn the steps to take when addressing network security threats. Either the auto-analyst can observe the SOC team member analyst, e.g., the steps the SOC team member analyst usually takes, and suggest automating the steps if the steps are commonly repeated across the SOC team base, or the auto-analyst can automatically detect what information it is missing (according to previously closed incidents) and pull the information in from the respective APIs to save time for the SOC analyst. The automated cross-product playbooks can thus be easily expanded according to the needs of the SOC team. Examples of such an expansion may include binaries downloaded and executed in sandboxes, uniform resource locator (URL) payloads downloaded and provided to a dedicated network security entity team, etc. Since these actions are routine and can be automated, the actions can also be added to the already existing playbooks.

In configurations, once an auto-analyst exhausts all of its options, the auto-analyst may summarize the incident, the collected observables, and actions it has taken. Additionally, the auto-analyst may suggest further actions to be taken by the network security entity analyst and adds the actions to the incident summary.

In configurations, an auto-analyst architecture according to the techniques described herein may include, for example, the auto-analyst itself, which is an incident resolution/recommender system. The auto-analyst may contain the playbooks that take actions and gather information to aide security incident response and remediation. This auto-analyst engine is also responsible for making the decision of what automated actions take place. The auto-analyst architecture may also include incidents on an input (IN), which generally refer to events detected on a network device originating from multiple security products. The auto-analyst architecture may additionally include an incident database, which may be a database of previously processed incidents. The incident database may contain the information gathered during incident resolution including, but not limited to, malicious secure hash algorithms (SHAs), malicious URLs, previous incident verdicts, etc. The auto-analyst architecture may further include an incident summary (OUT), which may be a summary of the incident on a given device. This includes the gathered information, steps taken and recommended steps that should be taken next. The auto-analyst architecture may also include an event gateway, which may be a component that is responsible for handling the actions (GetInformation, TakeAction, Responses) of the automated threat response and communicating with the endpoints, third-party intel and other products. The auto-analyst architecture may further include product APIs (e.g., security product APIs), which generally are the APIs for the products that generate security incidents on the input, third-party intel APIs, etc.

As an example, consider a scenario where an incident that involves a task automation and configuration management program communicating to an anomalous uniform resource locator (URL) and the severity is low. GetInformation may be used to determine if the URL is malicious. Thus, GetInformation may query the incident database and/or third-party intel APIs for information about the URL. If the URL is not malicious, the incident is summarized as a false positive (FP). The process is/is not running anymore. No further actions are needed.

However, if the URL is malicious, then further steps may be taken. TakeAction may be used to add the malicious URL to the incident database. In particular, TakeAction may add the gathered information to the local incident database along with process information. GetInformation may be used to find the process that initiated the connection in endpoint detection and response (EDR), e.g., was the process monitored? GetInformation may check if the information about the process can be gathered. If the process was not monitored, the process may be summarized as a true process (TP). The summary may include that the EDR did not monitor this connection. Further remediation steps may be taken, e.g., re-image the machine, e.g., network device, and configure the EDR to monitor all connections.

However, if the process was monitored, then further steps may be taken. GetInformation may be used to determine if the process with process identifier (PID) is still running. In particular, GetInformation may gather information about the process from the EDR. If the process is not running anymore, the incident may be summarized as a TP. The summary may include that the process that accessed the malicious URL was not running anymore. Further remediation steps may include re-imaging the machine (network device).

If the process is still running. TakeAction may kill the process with the saved PID. In particular, TakeAction may kill the malicious process that initiated the connection to the malicious URL. The incident may be summarized as a TP. The summary may include that the process that initiated the connection to the malicious URL was killed. Further remediation steps may include re-imaging the machine (network device). In configurations, with TakeAction, there may be other actions taken such as downloading the binary to a sandbox, (e.g., the binary is "sandboxed" and runs separately from the host machine) and executing the binary for further analysis. This step may be easily expanded based on the requirements of the environment.

In configurations, the network security alerts may be prioritized and stored in a database. The prioritized inputs may be provided to the input (IN) of the auto-analyst architecture and handled as described herein in order based on priority. In configurations, an alert risk assigner takes the alert feeds from security products on the network devices and combines the original alert severity of the alert feeds with information about the asset risk and importance collected over a longer period of time. In configurations, the final risk score may be defined in the following way by Equation 1 below:

$$FinalRiskScore = f(AlertSeverity,\ DeviceRiskScore) \quad \text{Equation 1}$$

In Equation 1, $f$ represents a generic function (e.g., a linear combination of AlertSeverity and DeviceRiskScore), AlertSeverity represents the original severity given by the security product in a security alert, and DeviceRiskScore represents a dynamic value aggregated from device risks provided by individual products, external resources, and the internal alert risk assigner statistics. The DeviceRiskScore changes dynamically according to the current state of the network. In configurations, the SOC team member that is consuming the alerts may provide feedback to the alert risk assigner to fine-tune the function $f$ to provide more accurate values. A simple but powerful side-product of this approach is the propagation of information about the asset from one security product to alerts from other security products.

In configurations, the asset risk score may be estimated and updated based on two or more factors that may be combined. For example, one of the factors may include user defined information about the asset from each individual security product (if present). Another example may include network policy and other static information about the network. A further example may include dynamic asset risk estimation from the current state of the network. In configurations, not all of the factors need to be present and/or used, which enables assigning a final risk score to network devices (assets) unseen by the security products.

In configurations, the alert risk assigner may comprise extractors, a risk assigner, and an asset library.

In configurations, the asset library may store information about the asset, such as, for example, operating system (OS), known vulnerabilities, common communication hours, policy connected to the asset, etc. The input extractors may consume data feeds from individual security products and feed the normalized information to the asset library. The risk score assigner may enrich the stream of security alerts with the final risk score by combining the information from the asset library with the original alert severity.

In configurations, there are at least two ways the alert risk assigner interacts with data. As an example, a first way the alert risk assigner interacts with data may include the extractors tapping into individual product feeds and serving as adapters. The extractors may extract all the information relevant to asset risk assignment and converts the information to a normalized message. This normalized message may be forwarded to the asset library. Each normalized message generally contains an asset identifier. The asset library looks at the asset identifier and pulls out a record of the asset that is to be updated. If the asset is not present in the asset library, then a new record is created. In configurations, each record may have the following property types—categorical (e.g., OS type) and incremental (e.g., days active). In configurations, more property types may be included. Then, each piece of information that is not in conflict with the information in the library record is filled in. In configurations, if a conflict is detected, a message for the SOC team member is created.

As another example, a second way the alert risk assigner interacts with data, the risk assigner enriches the alert stream published to the subsequent solution, such as, for example, security information and event management system (SIEM). Each alert in the alert stream is enriched with the risk score calculated for the alert. The alert risk assigner pulls out the information about the asset from the asset library and calculates the FinalRiskScore for the alert as previously defined.

Accordingly, in configurations, a method includes receiving, at an automated threat response within a network, an incident relating to network security at a network device. The method also includes automatically determining, by an auto-analyst engine of the automated threat response, whether the incident is a security problem. The method further includes based at least in part on the automatically determining whether the incident is a security problem, taking, by the auto-analyst engine, at least one further first step relating to the incident. In configurations, if the incident is not a security problem, the at least one further first step comprises generating, by the auto-analyst engine, a summary relating to the incident, wherein the summary comprises an indication of the incident as a false positive and adding the first summary to an incident database. In configurations, if the incident is a security problem, the at least one further first step comprises adding, by the auto-analyst engine, information regarding the incident to the incident database.

In further configurations, the method further comprises automatically determining, by the auto-analyst engine, whether a process is monitored and based at least in part on the automatically determining whether the process is monitored, taking, by the auto-analyst engine, at least one further second step relating to the incident. If the process is not monitored, the at least one further second step comprises at least one of (i) generating the summary, by the auto-analyst engine, relating to the incident, wherein the summary comprises the indication of the incident as a true positive, (ii) adding the summary to the incident database, or (iii) taking a remediation action.

In some configurations, if the incident is a security problem, the method further comprises determining, by the auto-analyst engine, the process that initiated a connection to the network device, wherein the connection is related to the incident.

In additional configurations, if the process is monitored, the at least one further second step comprises determining, by the auto-analyst engine, whether the process is still running, wherein if the process is not still running, the at least one further second step comprises at least one of (i) generating the summary, by the auto-analyst engine, relating to the incident, wherein the summary comprises the indication of the incident as a true positive, (ii) adding the summary to the incident database, or (ii) taking the remediation action.

In some configurations, if the process is still running, the method further comprises at least one of closing, by the auto-analyst, the connection to a uniform resource locator (URL), closing, by the auto-analyst, a port on which communication is occurring, isolating, by the auto-analyst, the network device, discontinuing, by the auto-analyst engine, the process running, or quarantining, by the auto-analyst, the network device and generating the summary, by the auto-analyst engine, relating to the incident, wherein the summary comprises the indication of the incident as a true positive, (ii) adding the summary to the incident database.

In further configurations, the method also comprises obtaining, by the auto-analyst engine, information related to the incident from at least one of (i) one or more security product application programming interfaces (APIs) or (ii) the incident database.

In additional configurations, the method further comprises suggesting, by the auto-analyst engine to a network security entity, further actions that may be taken based at least in part on a history of incidents.

In some configurations, the method further comprises providing, by the auto-analyst engine to a network security entity, the summary and receiving, by the auto-analyst engine from the network security entity, feedback related to the summary.

Thus, the techniques and architecture provide for a framework for automated threat response and remediation of incidents generated by single or multiple security products, especially for extended detection and response (XDR) systems. In particular, the techniques and architecture provide for an automated threat response that is handled by emulating network security entity analysts' steps during incident response and remediation. The automated threat response can automatically confirm or disapprove of detection verdicts thereby reducing false positives that analysts usually have to deal with. If any actions are needed from a network security entity analyst, a concise report of actions taken, gathered information and recommended next steps may be provided by the automated threat response, significantly reducing the time and resources needed to resolve an incident. Automating the steps of well-known play books and inferring the steps from observing the analysts can significantly reduce the time that the SOC analyst spends on an alert. This leads to faster incident response, the SOC team focusing on more challenging tasks requiring deeper investigation, or even a smaller SOC team.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example network 100 that includes network devices 102*a* . . . 102*n*. In configurations, the network devices 102*a*, . . . , 102*n* may be a server, a computing device (e.g., a laptop, a tablet, a smart phone, a desktop computer, etc.), a peripheral device (e.g., a printer, a copy/fax machine, a router, a switch, etc.), an Internet of Things (IoT) device, etc. Each network device may include one or more security products 104*a*, . . . 104*n* from various vendors. A network security entity 106 (e.g., a security operations center (SOC) team including one or more individual members) monitors final risk scores 108 based on security alerts 110 from the security products 104*a*, . . . , 104*n* related to the corresponding network devices 102*a* . . . 102*n*, as well as other factors as described herein. The network 100 includes an alert risk assigner 112 that provides the final risk scores 108 to the network security entity 106, as described herein. In configurations, the final risk scores 108 are prioritized as described herein. As described herein, an automated threat response 114 is provided that auto-analyzes final risk scores 108 prior to one or more individual members of the network security entity 106 further analyzing the final risk scores 108, if needed, as described herein. In some configurations, no final risk scores 108 are generated and the automated threat response 114 auto-analyses the security alerts 110, which may or may not be prioritized. The auto-analyzed security alerts 110 may then be analyzed by one or more individual members of the network security entity 106, if needed. The one or more individual members of the network security entity 106 may provide feedback to the automated threat response 114. The network 100, e.g., the network devices 102*a*, . . . , 102*n* may communicate with one or more other external network(s) 116, e.g., a Cloud network, a hybrid network, etc.

In configurations, the network 100 may be configured with an extended detection and response (XDR) system, although in other configurations the network is not configured with an XDR system. As is known, extended detection and response, or XDR, is an open cybersecurity architecture that integrates security tools and unifies security operations across all security layers—users, endpoints, email, applications, networks, cloud workloads and data. With XDR, security solutions that are not necessarily designed to work together, e.g., security products from different vendors, can interoperate seamlessly on threat prevention, detection, investigation and response. XDR eliminates visibility gaps between security tools and layers, enabling overburdened SOC teams to detect and resolve threats faster and more efficiently, and to capture more complete, contextual data for making better security decisions and preventing future cyber-attacks.

Today organizations are bombarded by advanced threats (also called advanced persistent threats). These threats sneak past endpoint prevention measures and lurk in the network for weeks or months—moving around, gaining permissions, stealing data, and gathering information from the different layers of the IT infrastructure in preparation for a large-scale attack or data breach. Many of the most damaging and costly cyber-attacks and data breaches—ransomware attacks, business email compromise (BEC), distributed denial of service (DDoS) attacks, cyber espionage—are examples of advanced threats.

Organizations have armed themselves with scores of cybersecurity tools and technologies to fight these threats and close off the attack vectors, or methods, that cybercriminals use to launch them. Some of these tools focus on specific infrastructure layers; others collect log data and telemetry across multiple layers. In most cases these tools are siloed, e.g., they don't talk to each other. This leaves the network security entity 106 to correlate the alerts manually to separate the actual incidents from false positives and triage the incidents according to severity and coordinate them manually to mitigate and remediate threats. As a result, advanced threats take too long to identify and contain. By breaking down the siloes between layer-specific point solutions, XDR promises overextended security teams and SOCs the end-to-end visibility and integration they need to identify threats faster, respond to them faster and resolve them faster and to minimize the damage they cause.

XDR is typically consumed as a cloud-based or software as a service (SaaS) solution. It may also be the core technology driving a cloud or security solution provider's managed detection and response (MDR) offering. For example, XDR security solutions can integrate Individual security tools (or point solutions) such as antivirus, user and entity behavior analytics (UEBA), or firewalls; layer-specific security solutions such as EDR, endpoint protection platforms (EPPs), network detection and response (NDR) or network traffic analysis (NTA); and solutions that collect data or coordinate workflows across security layers, including security information and event management (SIEM) or security orchestration, automation and response (SOAR).

Figure 2:
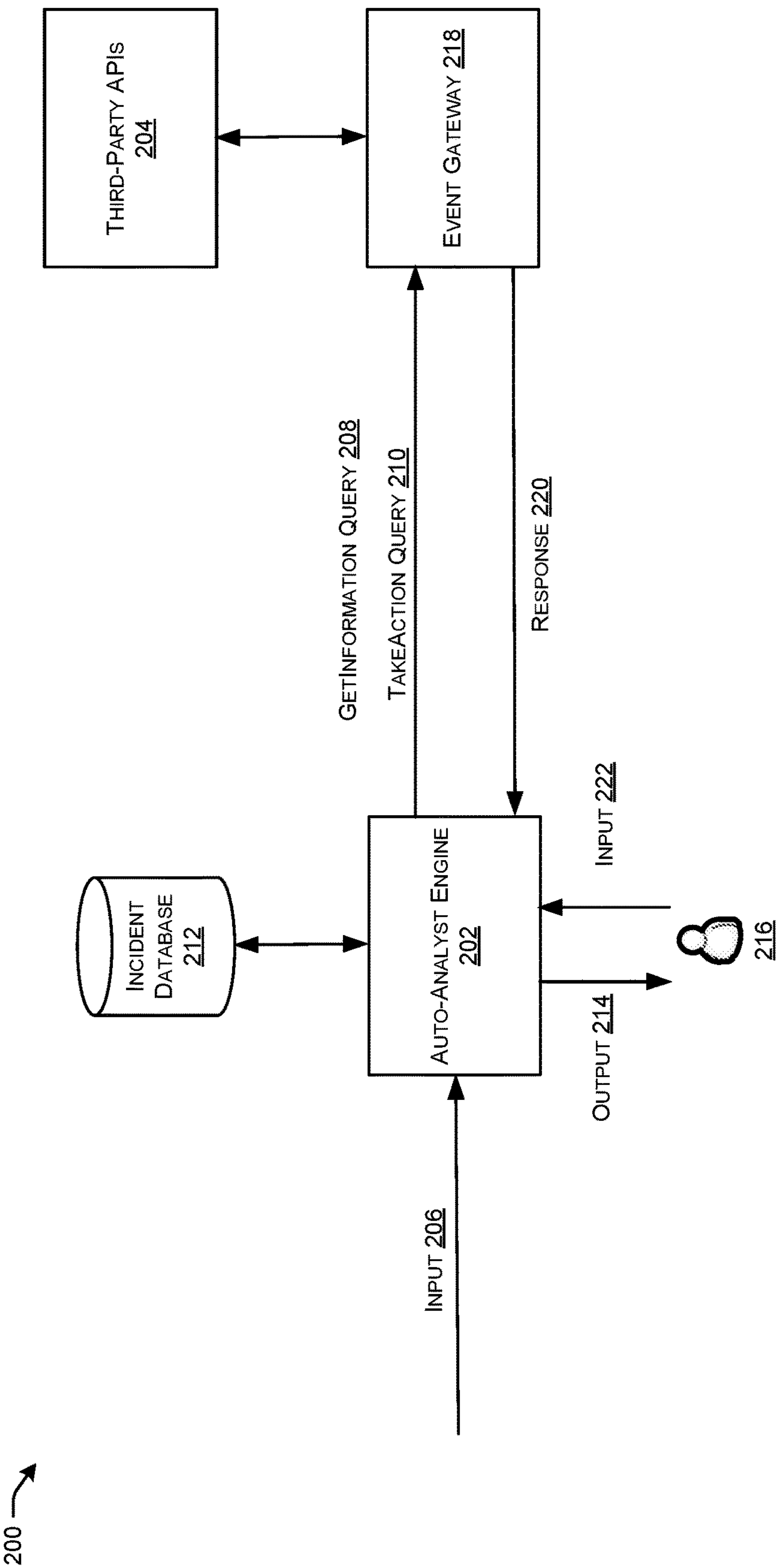
FIG. 2 schematically illustrates an example arrangement that provides the automated threat response of FIG. 1 in the form of a system that automates the process of execution of common steps of a network security alert remediation process, in accordance with techniques and architecture described herein.

FIG. 2 schematically illustrates an example arrangement that provides an automated threat response 200 in the form of a system that automates the process of execution of common steps of a network security alert remediation process.

As previously noted, the automated threat response 200 ingests network security alert events from multiple telemetry sources (security products 104, security product vendors, etc.). Based on steps defined in an auto-analyst engine 202 of the automated threat response, actions are taken automatically with the integrated auto-analyst engine 202 and third-party application programming interfaces (APIs) 204. Incidents (network security alert events) that may indicate a security problem in the network, e.g., network 100, are received on an input 206 to the automated threat response 200.

As an example, in configurations, there may be two types of queries the auto-analyst uses for threat response. A first type of query may be a "GetInformation" query 208 that seeks, for example, an incident identifier (ID), metadata related to the incident, etc. Based on the incident (network security alert event) that is on the input 206 to the automated threat response 200, the auto-analyst engine 202 queries a specific API for more information, e.g., a malicious binary execution leads to a GetInformation query 208 to see whether the malicious binary execution is still running on the endpoint. A second type of query may be "TakeAction" query 210. If the auto-analyst engine 202 of the automated threat response 200 knows an action can be safely taken to remediate some network security threat, the auto-analyst engine 202 can automatically take the action, e.g., a suspicious binary may be deemed as malicious and is still running on the endpoint. In such a scenario, the auto-analyst engine 202 may send a TakeAction query 210 to the endpoint API to kill the running process, or the auto-analyst engine 202 can isolate the network device from the rest of the network to monitor the malicious process without posing a security threat to the rest of the network.

These two steps are generally used across the network security entity playbooks, e.g., SOC playbooks, which enables the auto-analyst engine 202 to work with already manually written workbooks, e.g., SOC playbooks. Moreover, in configurations, the auto-analyst engine 202 can also automatically learn the steps to take when addressing network security threats. Either the auto-analyst engine 202 can observe the SOC team member analyst. e.g., the steps the SOC team member analyst usually takes, and suggest to automate the steps if the steps are commonly repeated across the SOC team base, or the auto-analyst engine 202 can automatically detect what information it is missing (according to previously closed incidents) and pull the information in from the respective APIs to save time for the SOC analyst. The automated cross-product playbooks can thus be easily expanded according to the needs of the SOC team. Examples of such an expansion may include binaries downloaded and executed in sandboxes, URL payloads downloaded and provided to a dedicated network security entity team, etc. Since these actions are routine and can be automated, the actions can also be added to the already existing playbooks.

In configurations, once the auto-analyst engine 202 exhausts all of its options for addressing the incident, the auto-analyst engine 202 may summarize the incident including, for example, a description of the incident, the collected observables, possibly affected other network devices, actions it has taken, etc., and store this information in an incident database 212. The information may also be provided on an output 214 to a member of the network security entity, e.g., a SOC analyst 216. Additionally, the auto-analyst engine 202 may suggest further actions to be taken by the SOC analyst 216 and may add the actions to the incident summary. Thus, in configurations, the SOC analyst 216 may perform further actions with respect to the incident (network security alert event), where the further actions may or may not be based on further actions suggested by the auto-analyst engine 202.

More particularly, in configurations, an auto-analyst architecture according to the techniques described herein may include, for example, the auto-analyst engine 202 itself, which is an incident resolution/recommender system. The auto-analyst engine 202 may contain the playbooks that take actions and gather information to aide security incident response and remediation. The auto-analyst engine 202 is also responsible for making the decision of what automated actions take place. The auto-analyst architecture may also include incidents on the input 206, which generally refer to events detected on a network device, e.g., network device 102, originating from one or more security products, e.g., one or more security products 104. The incidents may be in the form of security alerts, e.g., security alerts 110, and may or may not be prioritized. In configurations, the incidents may be in the form of final risk scores, e.g., final risk scores 108. In configurations, the final risk scores 108 may be prioritized.

The auto-analyst architecture may additionally include the incident database 212, which may be a database of previously processed incidents (network security alert events). The incident database 212 may contain the information gathered during previous incident resolutions including, but not limited to, malicious SHA, malicious URLs, previous incident verdicts, etc. The information in the incident database 212 may be used by the auto-analyst engine 202 when handling subsequent incidents (network security alert events). The auto-analyst architecture may further include the output 214 that provides an incident summary, which may be a summary of the incident on a given network device. This includes the gathered information, steps taken and recommended steps that should be taken next. The auto-analyst architecture may also include an event gateway 218, which may be a component that is responsible for handling the actions (GetInformation, TakeAction, and Responses 220 to the queries) of the automated threat response 200 and communicating with the network endpoints, third-party intel and other products. The auto-analyst architecture may further include the product APIs 204 (e.g., security product APIs), which generally are the APIs for the security products that generate security incidents on the input, third-party intel APIs, etc. In configurations, the auto-analyst architecture may also include a second input 222 for feedback from the SOC analyst 216. The feedback may pertain to the accuracy of the information obtained, actions taken, etc., by the auto-analyst engine 202. This feedback can help train/improve the auto-analyst engine 202.

Figure 3:
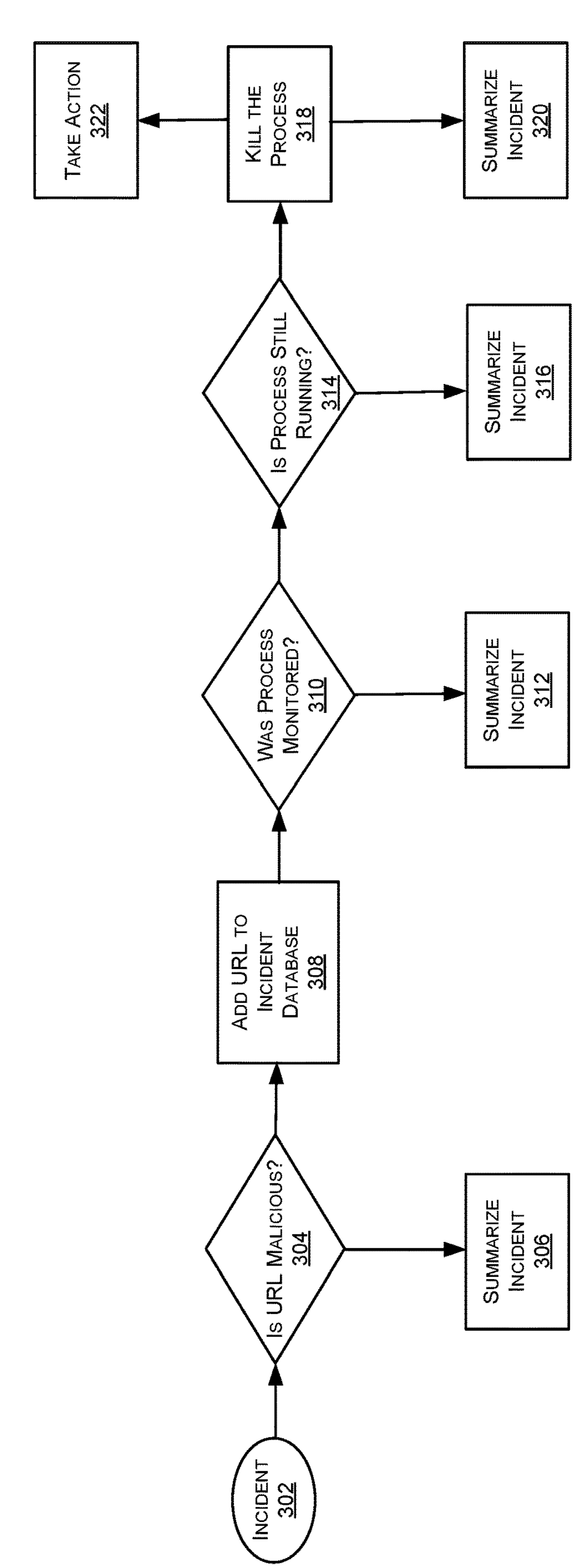
FIG. 3 schematically illustrates an example flow of steps an auto-analyst engine of the automated threat response of FIGS. 1 and 2 may take in response to an incident, in accordance with techniques and architecture described herein.

FIG. 3 illustrates an example flow 300 of steps the auto-analyst engine 202 may take in response to an incident. In the example, consider a scenario where, at 302, the incident involves a task automation and configuration management program communicating to an anomalous uniform resource locator (URL) and the severity is low. At 304, GetInformation may be used to determine if the URL is malicious. Thus, GetInformation may query the incident database, e.g., incident database 212, and/or third-party intel APIs, e.g., product APIs 204, for information about the URL. At 306, if the URL is not malicious, the incident is summarized as a false positive (FP). The summary may include whether the process is or is not running anymore. No further actions are needed.

However, if the URL is malicious, then further steps may be taken. At 308, TakeAction may be used to add the malicious URL to the incident database 212. In particular, TakeAction may add the gathered information to the local incident database along with process information. At 310, GetInformation may be used to find the process that initiated the connection in endpoint detection and response (EDR), e.g., was the process monitored? GetInformation may check if the information about the process can be gathered. If the process was not monitored, at 312 the process may be summarized as a true positive (TP). In configurations, the TP may not necessarily mean infection at this point. The summary/TP is being sent forward at this because no further actions are needed. The summary may include that the EDR did not monitor this connection. Further remediation steps may be taken, e.g., re-image the machine, e.g., network device, and configure the EDR to monitor all connections.

However, if the process was monitored, then further steps may be taken. At 314, GetInformation may be used to determine if the process with the process identifier (PID) is still running. In particular, GetInformation may gather information about the process from the EDR. If the process is not running anymore, at 316, the incident may be summarized as a TP. The summary may include that the process that accessed the malicious URL was not running anymore. Further remediation steps may include re-imaging the machine (network device).

If the process is still running, at 318, TakeAction may kill the process with the saved PID. In particular, TakeAction may kill the malicious process that initiated the connection to the malicious URL. At 320, the incident may be summarized as a TP. The summary may include that the process that initiated the connection to the malicious URL was killed. Further remediation steps may include re-imaging the machine (network device). In configurations, with TakeAction, at 322 there may be other actions taken such as downloading the binary to a sandbox (e.g., the binary is "sandboxed" and runs separately from the host machine) and executing the binary for further analysis. This step may be easily expanded based on the requirements of the environment.

The final verdicts of the incident may be described in the "Summarize" blocks, i.e., blocks 306, 312, 316, and 320, including the gathered information and recommended further steps. However, these playbooks, may be easily extended. For example, the binary that initiated the communication to the URL could be downloaded and executed in a sandbox, etc.

Figure 4:
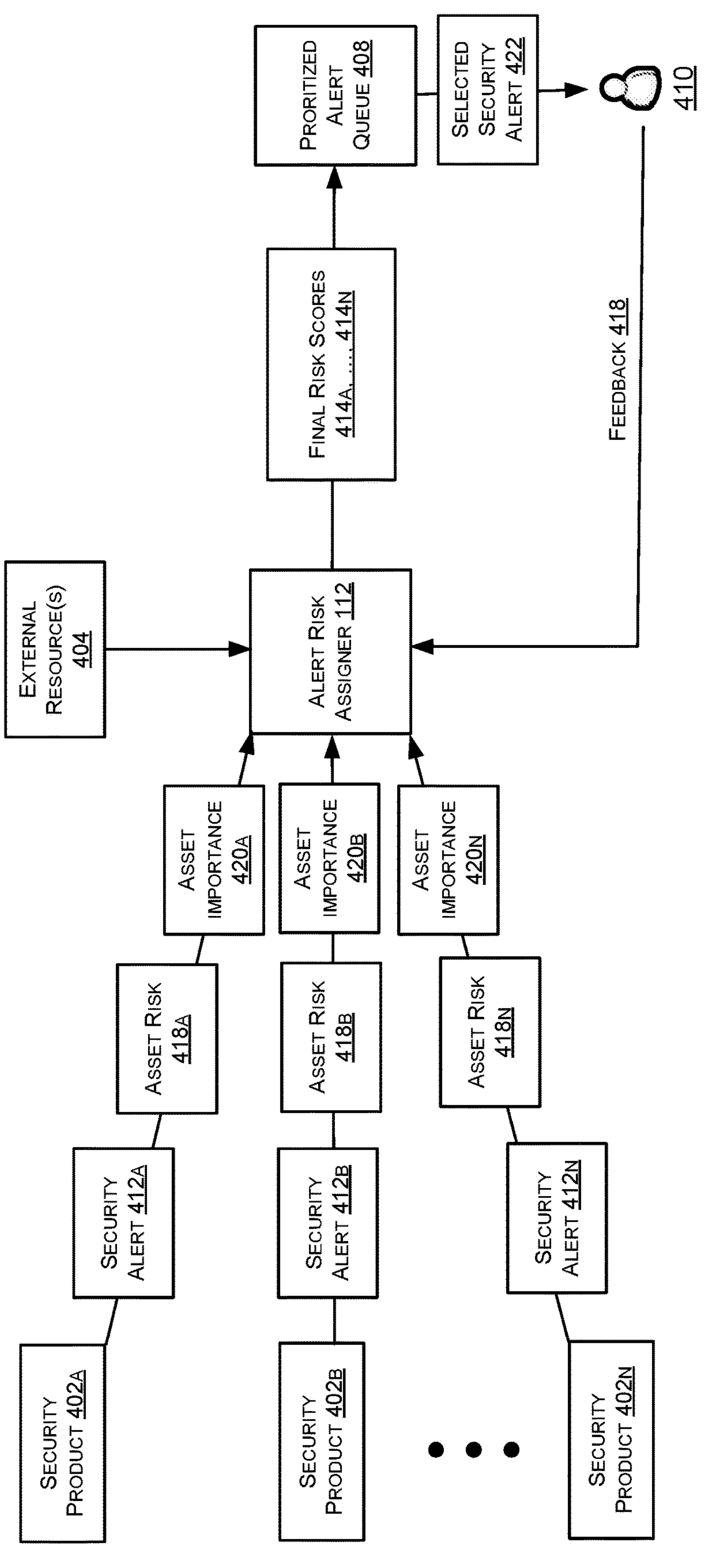
FIG. 4 schematically illustrates an example arrangement that utilizes information to enhance security alerts from security products from various vendors, in accordance with techniques and architecture described herein.

As previously noted, in configurations the incidents on the input 206 to the automated threat response 200 may be in the form of final risk scores, e.g., final risk scores 108. FIG. 4 schematically illustrates an example arrangement 400 that utilizes information to enhance security alerts, e.g., security alerts 110*a* . . . 110*n*, from security products 402*a*, . . . 402*n* (e.g., security products 104*a*, . . . , 104*n*) from various vendors. In configurations, this information is provided to an alert risk assigner 406 the generates final risk scores that are provided to a prioritized alert queue 408 that may be analyzed by the auto-analyst engine 202 and then, if needed, by a security team member 410, e.g., a member of the network security entity 106.

In configurations, the alert risk assigner 406 is a system to assign the correct risk score to security alerts 412, e.g., security alerts 110, coming from all the security products, e.g., security products 104*a*, . . . , 104*n*, implemented in a network, e.g., network 100, configured with an XDR system. The alert risk assigner 406 dynamically estimates the asset importance (e.g., network device importance) in the network and combines this information with the alert severity into a final risk score 414. The security alerts 412 can then be prioritized based on the final risk scores 414, giving a security operations center (SOC) team, e.g., the network security entity 106, the opportunity to resolve the most important security alerts 412 first. Thus, the techniques and architecture provide a system that dynamically computes a final alert risk score from alert severities originating from multiple sources, while also considering the role and the importance of the assets.

In configurations, the alert risk assigner 406 enriches a combined security alert feed comprising security alerts 412*a*, . . . , 412*n* from all the individual security products 402*a*, . . . , 402*n* for network assets or network devices in a network. The alert risk assigner 406 also communicates with static or external resources 404 such as, for example, network policy, network databases, etc. Each security alert 412*a*, . . . , 412*n* on the input to the prioritized alert queue 408 is assigned a corresponding final risk score 414*a*, . . . , 414*n* that is used to prioritize the security alerts in the prioritized alert queue for a SOC team member, e.g., security team member 410. The security alerts 412*a*, . . . , 412*n* with their corresponding final risk scores 414*a*, . . . , 414*n* are provided to the prioritized alert queue 408. The security team member 410 may then select a selected security alert 422 the prioritized alert queue 408 to handle based on the priority determined based on the final risk scores 414.

In configurations, if the ordering is incorrect (e.g., some security product assigns severity too strictly), the security team member 410 can provide feedback 416 to the alert risk assigner 406 to adjust weights for the specific type of security alerts 412. Thus, the alert risk assigner 406 may use a formula and/or machine learning (ML) model to generate the final risk scores 414 for the security alerts 412*a*, . . . , 412*n*.

In configurations, the alert risk assigner 406 takes the security alerts 412*a*, . . . , 412*n* from the security products 402*a*, . . . , 402*n* and combines the original alert severity of the security alerts 412*a*, . . . , 412*n* (e.g., risk=1, risk=5, risk=4, etc.) with information comprising one or more of an asset risk 418*a*, . . . , 418*n*, e.g., a security risk corresponding to a network device 102 from which the security alert 412 originated, and an asset importance 420*a*, . . . , 420*n*, e.g., an importance associated with the network device 102 from which security alert 412 originated, collected over a longer period of time. In configurations, the final risk score 414 may be defined in the following way by Equation 1 below:

$$FinalRiskScore = f(AlertSeverity, DeviceRiskScore) \quad \text{Equation 1}$$

In Equation 1, $f$ represents a generic function (e.g., a linear combination of AlertSeverity and DeviceRiskScore), AlertSeverity represents the original severity given by the security product 402 in a security alert 412, and DeviceRiskScore represents a dynamic value aggregated from asset risks 418*a*, . . . , 218*n* provided by individual products, external resources, and the internal alert risk assigner 406 statistics. The DeviceRiskScore changes dynamically according to the current state of the network. In configurations, the security team member 410 that is consuming the final risk scores 414 may provide feedback 416 to the alert risk assigner 406 to fine-tune the function $f$ to provide more accurate values. A simple but powerful side-product of this approach is the propagation of information about the asset (network device) from one security product 402 to security alerts 412 from other security products 402.

In configurations, the asset risk 418*a*, . . . , 418*n* may be estimated and updated based on two or more factors that may be combined. For example, one of the factors may include user defined information about the asset (network device) from each individual security product 402 (if present). Another example may include network policy and other static information about the network. Examples of the other static information may include one or more of a type of device of the network device, an operating system (OS) of the network device, known vulnerabilities of the network device, common communication hours, policy connected to the network device, an identity of a user of the first network device, a position within the network of the user, and a vendor of the security product associated with the network device. A further example may include dynamic asset risk estimation from the current state of the network. In configurations, not all of the factors need to be present and/or used, which enables assigning a final risk score 414 to assets (network devices) unseen by the security products 402.

Figure 5:
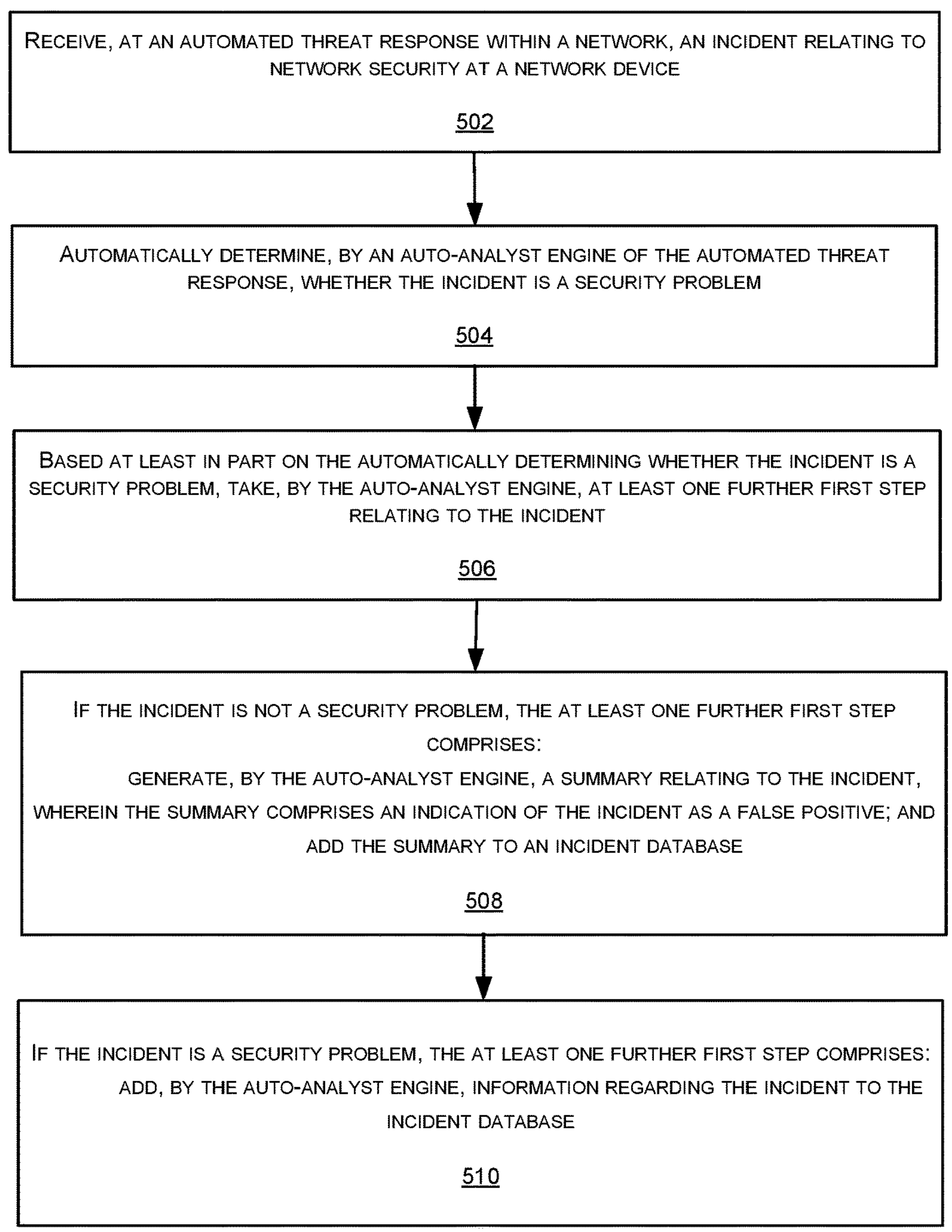
FIG. 5 illustrates a flow diagram of an example method for automated threat response in a network, e.g., the network of FIG. 1, in accordance with the techniques and architecture described herein.

FIG. 5 illustrates a flow diagram of an example method 500 and illustrates aspects of the functions performed at least partly by devices of a network as described with respect to FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of an example method 500 for automated threat response in a network, e.g., network 100. In some examples, the method 500 may be performed by a system comprising one or more processors and one or more non-transitory computer-readable media storing computer-executable instructions that, when executed by the one or more processors, cause the one or more processors to perform the method 500.

At 502, an automated threat response within a network receives an incident relating to network security at a network device. For example, the automated threat response 200 ingests network security alert events from multiple telemetry sources (security products 104, security product vendors, etc.). Based on steps defined in an auto-analyst engine 202 of the automated threat response, actions are taken automatically with the integrated auto-analyst engine 202 and third-party application programming interfaces (APIs) 204. Incidents (network security alert events) that may indicate a security problem in the network, e.g., network 100, are received on an input 206 to the automated threat response 200.

At 504, an auto-analyst engine of the automated threat response determines whether the incident is security problem. At 506, based at least in part on the automatically determining whether the incident is a security problem, taking, by the auto-analyst engine, at least one further first step relating to the incident. For example, in configurations, there may be two types of queries the auto-analyst uses for threat response. A first type of query may be a "GetInformation" query 208 that seeks, for example, an incident identifier (ID), metadata related to the incident, etc. Based on the incident (network security alert event) that is on the input 206 to the automated threat response 200, the auto-analyst engine 202 queries a specific API for more information, e.g., a malicious binary execution leads to a GetInformation query 208 to see whether the malicious binary execution is still running on the endpoint. A second type of query may be "TakeAction" query 210. If the auto-analyst engine 202 of the automated threat response 200 knows an action can be safely taken to remediate some network security threat, the auto-analyst engine 202 can automatically take the action, e.g., a suspicious binary may be deemed as malicious and is still running on the endpoint. In such a scenario, the auto-analyst engine 202 may send a TakeAction query 210 to the endpoint API to kill the running process, or the auto-analyst engine 202 can isolate the network device from the rest of the network to monitor the malicious process without posing a security threat to the rest of the network.

These two steps are generally used across the network security entity play books, e.g., SOC playbooks, which enables the auto-analyst engine 202 to work with already manually written workbooks, e.g., SOC playbooks. Moreover, in configurations, the auto-analyst engine 202 can also automatically learn the steps to take when addressing network security threats. Either the auto-analyst engine 202 can observe the SOC team member analyst, e.g., the steps the SOC team member analyst usually takes, and suggest to automate the steps if the steps are commonly repeated across the SOC team base, or the auto-analyst engine 202 can automatically detect what information it is missing (according to previously closed incidents) and pull the information in from the respective APIs to save time for the SOC analyst. The automated cross-product playbooks can thus be easily expanded according to the needs of the SOC team. Examples of such an expansion may include binaries downloaded and executed in sandboxes, URL payloads downloaded and provided to a dedicated network security entity team, etc. Since these actions are routine and can be automated, the actions can also be added to the already existing playbooks.

At 508, if the incident is not a security problem, the at least one further first step comprises generating, by the auto-analyst engine, a summary relating to the incident, wherein the summary comprises an indication of the incident as a false positive and adding the first summary to an incident database. At 510, if the incident is a security problem, the at least one further first step comprises adding, by the auto-analyst engine, information regarding the incident to the incident database. For example, once the auto-analyst engine 202 exhausts all of its options for addressing the incident, the auto-analyst engine 202 may summarize the incident including, for example, a description of the incident, the collected observables, possibly affected other network devices, actions it has taken, etc., and store this information in an incident database 212. The information may also be provided on an output 214 to a member of the network security entity, e.g., a SOC analyst 216. Additionally, the auto-analyst engine 202 may suggest further actions to be taken by the SOC analyst 216 and may add the actions to the incident summary. Thus, in configurations, the SOC analyst 216 may perform further actions with respect to the incident (network security alert event), where the further actions may or may not be based on further actions suggested by the auto-analyst engine 202.

Thus, in accordance with configurations described herein, a framework for automated threat response and remediation of incidents generated by single or multiple security products, especially for extended detection and response (XDR) systems, is provided. In particular, the techniques and architecture provide for an automated threat response that is handled by emulating network security entity analysts' steps during incident response and remediation. The automated threat response can automatically confirm or disapprove of detection verdicts thereby reducing false positives that analysts usually have to deal with. If any actions are needed from a network security entity analyst, a concise report of actions taken, gathered information and recommended next steps may be provided by the automated threat response, significantly reducing the time and resources needed to resolve an incident. Automating the steps of well-known playbooks and inferring the steps from observing the analysts can significantly reduce the time that the SOC analyst spends on an alert. This leads to faster incident response, the SOC team focusing on more challenging tasks requiring deeper investigation, or even a smaller SOC team.

Figure 6:
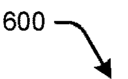
FIG. 6 is a computer architecture diagram showing an example computer hardware architecture for implementing a device that can be utilized to implement aspects of the various technologies presented herein.
Figure 6:
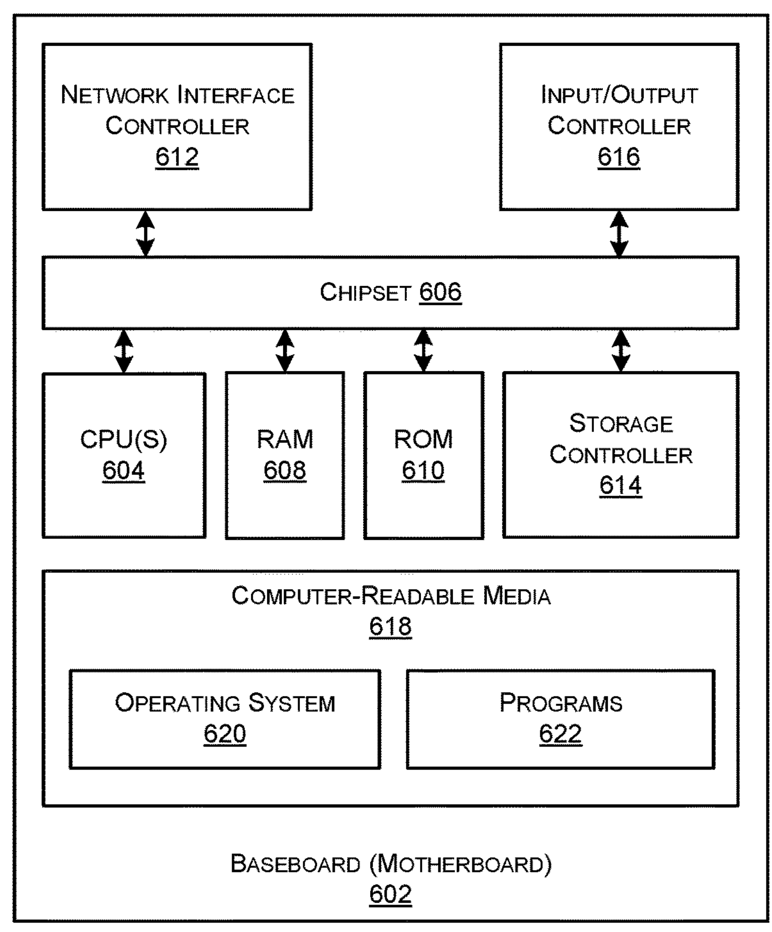

FIG. 6 shows an example computer architecture for a computing device 600 capable of executing program components for implementing the functionality described above. In configurations, one or more of the computing devices 600 may be used to implement one or more of the components of FIGS. 1-5. The computer architecture shown in FIG. 6 illustrates a conventional server computer, router, switch, workstation, desktop computer, laptop, tablet, network appliance, e-reader, smartphone, or other computing device, and can be utilized to execute any of the software components presented herein. The computing device 600 may, in some examples, correspond to a physical device or resources described herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network. The chipset 606 can include functionality for providing network connectivity through a NIC 612, such as a gigabit Ethernet adapter. In configurations, the NIC 612 can be a smart NIC (based on data processing units (DPUs)) that can be plugged into data center servers to provide networking capability. The NIC 612 is capable of connecting the computing device 600 to other computing devices over networks. It should be appreciated that multiple NICs 612 can be present in the computing device 600, connecting the computer to other types of networks and remote computer systems.

The computing device 600 can include a storage device 618 that provides non-volatile storage for the computer. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the cloud network, and or any components included therein, may be supported by one or more devices similar to computing device 600. Stated otherwise, some or all of the operations described herein may be performed by one or more computing devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more virtual resources executing on the computing device 600. In some examples, the virtualization layer may be supported by a hypervisor that provides one or more virtual machines running on the computing device 600 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

ingesting, at an automated threat response within a network, network alert events from multiple telemetry sources, wherein the multiple telemetry sources comprise (i) multiple security products from multiple vendors, (ii) multiple security product vendors, and (iii) operating system logs;

based on the ingesting, automatically determining, by an auto-analyst engine of the automated threat response, whether a particular network alert event is a security problem; and based at least in part on the automatically determining whether the particular network alert event is a security problem, taking, by the auto-analyst engine, at least one further first step relating to the particular network alert event, wherein if the particular network alert event is not a security problem, the at least one further first step comprises:

generating, by the auto-analyst engine, a summary relating to the particular network alert event, wherein the summary comprises an indication of the particular network alert event as a false positive; and adding the summary to an incident database, and wherein if the particular network alert event is a security problem, the at least one further first step comprises:

adding, by the auto-analyst engine, information regarding the particular network alert event to the incident database.

2. The method of claim 1, further comprising:

automatically determining, by the auto-analyst engine, whether a process is monitored; and based at least in part on the automatically determining whether the process is monitored, taking, by the auto-analyst engine, at least one further second step relating to the particular network alert event:

wherein if the process is not monitored, the at least one further second step comprises at least one of (i) generating the summary, by the auto-analyst engine, relating to the particular network alert event, wherein the summary comprises the indication of the particular network alert event as a true positive, (ii) adding the summary to the incident database, or (iii) taking a remediation action.

3. The method of claim 2, wherein if the particular network alert event is a security problem, the method further comprises:

determining, by the auto-analyst engine, the process that initiated a connection to the network device, wherein the connection is related to the particular network alert event.

4. The method of claim 3, wherein if the process is monitored, the at least one further second step comprises:

determining, by the auto-analyst engine, whether the process is still running, wherein if the process is not still running, the at least one further second step comprises at least one of (i) generating the summary, by the auto-analyst engine, relating to the particular network alert event, wherein the summary comprises the indication of the particular network alert event as a true positive, (ii) adding the summary to the incident database, or (ii) taking the remediation action.

5. The method of claim 4, wherein if the process is still running, the method further comprises:

at least one of closing, by the auto-analyst engine, the connection to a uniform resource locator (URL), closing, by the auto-analyst engine, a port on which communication is occurring, isolating, by the auto-analyst engine, the network device, discontinuing, by the auto-analyst engine, the process running, or quarantining, by the auto-analyst engine, the network device; and generating, by the auto-analyst engine, the summary relating to the particular network alert event, wherein the summary comprises the indication of the particular network alert event as a true positive, (ii) adding the summary to the incident database.

6. The method of claim 1, further comprising:

obtaining, by the auto-analyst engine, information related to the particular network alert event from at least one of (i) one or more security product application programming interfaces (APIs) or (ii) the incident database.

7. The method of claim 1, further comprising:

suggesting, by the auto-analyst engine to a network security entity, further actions that may be taken based at least in part on a history of network alert events.

8. The method of claim 1, further comprising:

providing, by the auto-analyst engine to a network security entity, the summary; and receiving, by the auto-analyst engine from the network security entity, feedback related to the summary.

9. A system comprising:

one or more processors; and one or more non-transitory computer-readable media storing computer-executable instructions that, when executed by the one or more processors, cause the one or more processors to perform actions comprising:

ingesting, at an automated threat response within a network, network alert events from multiple telemetry sources, wherein the multiple telemetry sources comprise (i) multiple security products from multiple vendors, (ii) multiple product vendors, and (iii) operating system logs;

based on the ingesting, automatically determining, by an auto-analyst engine of the automated threat response, whether a particular network alert event is a security problem; and based at least in part on the automatically determining whether the particular network alert event is a security problem, taking, by the auto-analyst engine, at least one further first step relating to the particular network alert event, wherein if the particular network alert event is not a security problem, the at least one further first step comprises:

generating, by the auto-analyst engine, a summary relating to the particular network alert event, wherein the summary comprises an indication of the particular network alert event as a false positive; and adding the summary to an incident database, and wherein if the particular network alert event is a security problem, the at least one further first step comprises:

adding, by the auto-analyst engine, information regarding the particular network alert event to the incident database.

10. The system of claim 9, wherein the actions further comprise:

automatically determining, by the auto-analyst engine, whether a process is monitored; and based at least in part on the automatically determining whether the process is monitored, taking, by the auto-analyst engine, at least one further second step relating to the particular network alert event:

wherein if the process is not monitored, the at least one further second step comprises at least one of (i) generating the summary, by the auto-analyst engine, relating to the particular network alert event, wherein the summary comprises the indication of the particular network alert event as a true positive, (ii) adding the summary to the incident database, or (iii) taking a remediation action.

11. The system of claim 10, wherein if the particular network alert event is a security problem, the actions further comprise:

determining, by the auto-analyst engine, a process that initiated a connection to the network device, wherein the connection is related to the particular network alert event.

12. The system of claim 11, wherein if the process is monitored, the at least one further second step comprises:

determining, by the auto-analyst engine, whether the process is still running, wherein if the process is not still running, the at least one further second step comprises at least one of (i) generating the summary, by the auto-analyst engine, relating to the particular network alert event, wherein the summary comprises the indication of the particular network alert event as a true positive, (ii) adding the summary to the incident database, or (ii) taking the remediation action.

13. The system of claim 12, wherein if the process is still running, the actions further comprise:

at least one of closing, by the auto-analyst engine, the connection to a uniform resource locator (URL), closing, by the auto-analyst engine, a port on which communication is occurring, isolating, by the auto-analyst engine, the network device, discontinuing, by the auto-analyst engine, the process running, or quarantining, by the auto-analyst engine, the network device; and generating the summary, by the auto-analyst engine, relating to the particular network alert event, wherein the summary comprises the indication of the particular network alert event as a true positive, (ii) adding the summary to the incident database.

14. The system of claim 9, wherein the actions further comprise:

obtaining, by the auto-analyst engine, information related to the particular network alert event from at least one of (i) one or more security product application programming interfaces (APIs) or (ii) the incident database.

15. The system of claim 9, further comprising:

suggesting, by the auto-analyst engine to a network security entity, further actions that may be taken based at least in part on a history of particular network alert events.

16. The system of claim 15, wherein the actions further comprise:

providing, by the auto-analyst engine to a network security entity, the summary; and receiving, by the auto-analyst engine from the network security entity, feedback related to the summary.

17. One or more non-transitory computer-readable media storing computer-executable instructions that, when executed by one or more processors, cause the one or more processors to perform actions comprising:

ingesting, at an automated threat response within a network, network alert events from multiple telemetry sources, wherein the multiple telemetry sources comprise (i) multiple security products from multiple vendors, (ii) multiple security product vendors, and (iii) operating system logs;

based on the ingesting, automatically determining, by an auto-analyst engine of the automated threat response, whether a particular network alert event is a security problem; and based at least in part on the automatically determining whether the particular network alert event is a security problem, taking, by the auto-analyst engine, at least one further first step relating to the particular network alert event, wherein if the particular network alert event is not a security problem, the at least one further first step comprises:

generating, by the auto-analyst engine, a summary relating to the particular network alert event, wherein the summary comprises an indication of the particular network alert event as a false positive; and adding the summary to an incident database, and wherein if the particular network alert event is a security problem, the at least one further first step comprises:

adding, by the auto-analyst engine, information regarding the particular network alert event to the incident database.

18. The one or more non-transitory computer-readable media of claim 17, wherein the actions further comprise:

automatically determining, by the auto-analyst engine, whether a process is monitored; and based at least in part on the automatically determining whether the process is monitored, taking, by the auto-analyst engine, at least one further second step relating to the particular network alert event:

wherein if the process is not monitored, the at least one further second step comprises at least one of (i) generating the summary, by the auto-analyst engine, relating to the particular network alert event, wherein the summary comprises the indication of the particular network alert event as a true positive, (ii) adding the summary to the incident database, or (iii) taking a remediation action.

19. The one or more non-transitory computer-readable media of claim 18, wherein if the particular network alert event is a security problem, the actions further comprise:

determining, by the auto-analyst engine, a process that initiated a connection to the network device, wherein the connection is related to the particular network alert event.

20. The one or more non-transitory computer-readable media of claim 19, wherein if the process is monitored, the at least one further second step comprises:

determining, by the auto-analyst engine, whether the process is still running, wherein if the process is not still running, the at least one further second step comprises at least one of (i) generating the summary, by the auto-analyst engine, relating to the particular network alert event, wherein the summary comprises the indication of the particular network alert event as a true positive, (ii) adding the summary to the incident database, or (ii) taking the remediation action, and wherein if the process is still running, the actions further comprise:

discontinuing, by the auto-analyst engine, the process running; and generating the summary, by the auto-analyst engine, relating to the particular network alert event, wherein the summary comprises the indication of the particular network alert event as a true positive, (ii) adding the summary to the incident database.

* * * * *